Patented Sept. 23, 1952

2,611,783

UNITED STATES PATENT OFFICE 2,611,783

SYNTHESIS OF ESTERS OF THIOLDIMETHYLVALERIC ACID

Roderick S. Spindt, Gibsonia, and Donald R. Stevens, Wilkinsburg, Pa., assignors to Gulf Research & Development Company, Pittsburgh, Pa., a corporation of Delaware No Drawing. Application February 17, 1949, Serial No. 77,048

14 Claims. (Cl. 260—455)

This invention relates to esters of thioldimethylvaleric acid and to a process for their preparation.

In our application, Serial No. 776,412, now Patent No. 2,470,876, filed September 26, 1947, of which this application is a continuation-in-part, we have disclosed a process for the preparation of 4,4-dimethylvaleric acid by the hydrolysis of sulfurized diisobutylene, said sulfurized diisobutylene being the orange-colored crystalline product melting at about 87° C. identified as 4-neopentyl-1,2-dithia-4-cyclopentene-3-thione obtained by reacting diisobutylene with elemental sulfur at a temperature between about 140° C. and about 350° C. under autogenous pressure, all as more fully described in application Serial No. 733,196, now U. S. Patent No. 2,535,705, filed March 7, 1947. In accordance with the process described in U. S. Patent No. 2,470,876 the crude hydrolysis reaction product which contains the metal salt of dimethylvaleric acid, along with by-product organic sulfides, disulfides, thiol acids, etc., may be treated in any of several ways to recover the acid. According to one mode of procedure the crude hydrolysis reaction product is treated with a mineral acid and then steam-distilled to obtain an aqueous liquid from which the acid may be recovered as, for example, by solvent extraction. According to another mode of operation the crude hydrolysis product may be treated with an alkaline oxidizing agent such as hydrogen peroxide to convert the by-product sulfur compounds to sulfates, after which the oxidized product is neutralized and steam-distilled to obtain an aqueous liquid from which the acid may be recovered as in accordance with the preceding process or alternatively the oxidation step may be replaced by one of alkylation, for example with a dialkyl sulfate, to convert the sulfur-containing by-products to alkyl derivatives.

The present invention is concerned with the treatment of the crude hydrolysis product with a dialkyl sulfate to cause an esterification reaction to take place and form as a new class of compounds the alkyl esters of thioldimethylvaleric acid. The formation of the alkyl esters of thioldimethylvaleric acid from the crude hydrolysis product is unexpected inasmuch as the presence of a considerable amount of water such as is present in our crude hydrolysis product ordinarily would convert thiol esters to their corresponding oxygen acids with the evolution of hydrogen sulfide. The thiol esters obtained in accordance with the process herein described are useful as plasticizing and modifying agents for synthetic and natural rubbers and resins.

The alkyl sulfate employed in the process is preferably one containing not more than 6 carbon atoms per alkyl group. While an alkyl sulfate containing more than 6 carbon atoms per alkyl group may be used in accordance with the process of our invention, alkyl sulfates having more than six carbon atoms per alkyl group are expensive to prepare. Therefore from an economic standpoint the process of our invention is particularly important when the alkyl group or groups of the alkyl sulfate contain six or less carbon atoms each. The alkyl groups may be primary or they may also be secondary. Representative of the alkyl sulfates which may be used in the process of our invention are dimethyl sulfate, diethyl sulfate, di-n-propyl sulfate, di-isopropyl sulfate, di-n-butyl sulfate, di-sec-butyl sulfate, di-n-amyl sulfate and di-n-hexyl sulfate.

In the process of our invention the reaction mass resulting from the treatment of the crude hydrolysis reaction product with a dialkyl sulfate contains not only the alkyl ester of thioldimethylvaleric acid but also the metal salt of 4,4-dimethylvaleric acid. The alkyl ester of thioldimethylvaleric acid is insoluble in water but soluble in a variety of organic solvents including benzene, acetone, methanol, pentane, and ethyl ether. The metal salt of 4,4-dimethylvaleric acid is soluble in water. The alkyl ester of thioldimethylvaleric acid, therefore, may be readily separated from the metal salt of 4,4-dimethylvaleric acid by extracting the ester from the reaction mass with an organic solvent such as, for example, ethyl ether. After removal of the alkyl ester from the reaction mass, 4,4-dimethylvaleric acid may be recovered from the aqueous phase by any of the methods described above.

The recovered 4,4-dimethylvaleric acid may be converted to the alkyl ester of thioldimethylvaleric acid by a conventional process such as, for example, by treating the 4,4-dimethylvaleric acid with thionyl chloride to obtain the acid chloride which may then be reacted with an alkyl mercaptan to produce the alkyl ester of thioldimethylvaleric acid. The process of this invention, therefore, offers a novel and economical means for obtaining high yields of the alkyl ester of thioldimethylvaleric acid from sulfur and diisobutylene.

The alkaline hydrolysis reaction is preferably carried out at reflux temperature under atmospheric pressure, but if desired it may be effected at higher temperatures under increased pressure. The hydrolytic agent employed may be any of the various alkaline agents, such as sodium hydroxide, potassium hydroxide, calcium hydroxide, barium hydroxide, sodium carbonate, potassium carbonate, etc. For reasons of economy the alkali metal hydroxides, e. g., sodium hydroxide, are usually preferred. The aqueous alkaline agent may be of any concentration ranging from as low as about 0.5 per cent by weight to about 50 per cent by weight or even higher. We have found, however, that more concentrated solutions are preferred in that they favor rapid hydrolysis of the $C_8H_{12}S_3$ compound. The alkaline agent is usually employed in an amount representing between about 4 and about 8 moles of the alkali per mole of the sulfurized diisobutylene. More than 8 moles may be used but is not necessary insofar as completeness of the reaction is concerned. The time required for completion of the reaction depends upon the particular aqueous alkaline agent employed and its concentration and upon the temperature employed. Ordinarily, however, the reaction is completed in from about 0.5 to 25 hours.

Upon completion of the alkaline hydrolysis the reaction mixture is cooled to a temperature of about 20° to 30° C. When a dialkyl sulfate is employed, temperatures of the order of 20° to 30° C. favor the utilization of only one alkyl group in the formation of the alkyl ester. The other alkyl group is bound up as the alkyl alkali metal sulfate. While temperatures greater than 30 C. ordinarily favor utilization of the second alkyl group as an alkylating agent, higher temperatures have a disadvantage in that the yield of the alkyl thiol ester may not be as high as that obtained at temperatures below 30° C. The alkyl sulfate in an amount equimolar to the amount of alkaline agent employed, that is, one mole of dialkyl sulfate for each mole of alkali used and a neutral solvent are then added to the cooled hydrolysis reaction mixture. While the presence of a neutral solvent is not necessary to obtain reaction between the alkali salt of thioldimethylvaleric acid of the reaction mixture and the alkyl sulfate, we have found that its presence is advantageous in that it expedites the separation of the alkyl ester of thioldimethylvaleric acid from the alkali salt of dimethylvaleric acid. As examples of the neutral solvents which we may employ may be mentioned ethyl ether, benzene, toluene, xylene, cyclohexane, and the like. After thoroughly agitating the mixture thus formed, the solvent phase, which also may be referred to as the organic phase, containing the alkyl ester of thioldimethylvaleric acid is separated from the aqueous phase containing the alkali metal salt of dimethylvaleric acid. The solvent phase is then washed with ammonium hydroxide and then with water until neutral. The solvent may then be removed by distillation and the remaining solution fractionated to obtain the desired alkyl ester of thioldimethylvaleric acid.

The aqueous phase from above which contains the alkali metal salt of dimethylvaleric acid and from which dimethylvaleric acid may be recovered may be treated with a mineral acid until it is distinctly acid whereupon an oily layer is formed. The oily layer contains 4,4-dimethylvaleric acid. The acidified mixture may then be steam-distilled to obtain an aqueous distillate from which 4,4-dimethylvaleric acid may be recovered in any suitable manner, such, for example, as by solvent extraction or by azeotropic distillation.

The following example will illustrate the preparation of an alkyl ester of thioldimethylvaleric acid, methyl 4,4-dimethyl-thiolpentanoate, in accordance with our invention.

Example I

Approximately 40.8 grams (0.2 mole) of the compound $C_8H_{12}S_3$ melting at about 87° C. and 64 grams (1.6 moles) of sodium hydroxide dissolved in 2 liters of water were placed in a flask fitted with a stirrer and a reflux condenser. The $C_8H_{12}S_3$ compound was the orange-colored crystalline product identified as 4-neopentyl-1,2-dithia-4-cyclopentene-3-thione. This compound was separated by fractional crystallization from the product obtained by reacting diisobutylene with sulfur at a temperature of about 170° C. and under a pressure of about 150 pounds per square inch. The mixture of $C_8H_{12}S_3$ compound and aqueous sodium hydroxide was heated with stirring at reflux temperature for about two hours, after which the mixture was cooled to room temperature. To the cooled hydrolyzed reaction mixture thus formed was then added with stirring a mixture consisting of 208 grams (1.6 moles) of dimethyl sulfate dissolved in 50 cc. of ethyl ether. The ether phase containing the methyl ester of thioldimethylvaleric acid was separated from the aqueous phase (I) and the aqueous phase (I) was extracted with two 100 cc. portions of ethyl ether. The ether extracts were then combined, washed with ammonium hydroxide, and then with water until neutral. The ether was then removed by distillation and the remaining solution was subjected to fractional distillation, whereby there was obtained a fraction boiling at 188° to 194° C. at 744 mm. pressure. This was refractionated and a fraction having a boiling point of 194° C. at 744 mm. pressure was analyzed and was found to be methyl 4,4-dimethyl-thiolpentanoate. The ultimate analysis of the product compared favorably with the calculated analysis for methyl 4,4-dimethyl-thiolpentanoate, as can be seen from the following table.

| Ultimate Analysis | Found for Product | Calculated for Methyl 4,4-Dimethyl-Thiolpentanoate |
| --- | --- | --- |
| Carbon | 60.66 | 60.45 |
| Hydrogen | 10.48 | 10.06 |
| Sulfur | 20.37 | 20.01 |
| Oxygen | [1] 8.49 | 9.48 |

[1] By difference.

In the above example we have illustrated the preparation of the methyl ester of thioldimethylvaleric acid by first hydrolyzing the $C_8H_{12}S_3$ compound with caustic and then adding the hydrolyzed reaction mixture thus formed to an ethereal solution of dimethyl sulfate. It should be understood, however, that the dimethylsulfate in a relatively high-boiling neutral solvent, such as xylene, and the aqueous solution of caustic may be added simultaneously to the $C_8H_{12}S_3$ compound without deviating from the scope of our invention.

As mentioned hereinbefore, where it is desired to obtain high yields of the alkyl ester of thioldimethylvaleric acid, from a given amount of sulfurized diisobutylene, the aqueous phase remaining after extracting the alkyl ester of thioldimethylvaleric acid from the reaction mass resulting from the treatment of the crude hydrolyzed reaction product with an alkyl sulfate, may be acidified with a mineral acid, steam-distilled, treated with thionyl chloride and then with the corresponding alkyl mercaptan. For example, the aqueous phase (I) from above may be acidified with sulfuric acid whereby an oily layer is formed. The oily layer may then be removed from the reaction mass by steam distillation. The oily layer of the distillate so obtained may then be decanted and the aqueous layer extracted with diethyl ether. The ethereal extract may then be combined with the oily layer and the combined product dried over anhydrous sodium sulfate and finally fractionally distilled. After removal of the ether fraction a light straw-colored liquid fraction distilling at 200° to 215° C. may be obtained. This product consists essentially of 4,4-dimethylvaleric acid. The acid thus formed may then be converted to its alkyl thiol ester in accordance with a conventional process as exemplified by the following Example.

*Example II*

Approximately 13 grams of 4,4-dimethylvaleric acid was placed in a flask, after which 12 grams of thionyl chloride was added. The reaction mixture thus formed was maintained at a temperature of about 80° C. until hydrogen chloride was no longer evolved. The acid chloride thus formed was then recovered by distilling the mixture and collecting the fraction which distilled over at 145° to 152° C. Eight grams of the acid chloride obtained by distillation was then added dropwise to a mixture consisting of 8 grams of pyridine and 6 grams of methyl mercaptan at a temperature of about −30° C. The pyridine takes up hydrogen chloride released in the reaction. While it is advantageous to carry out this reaction in the presence of pyridine at a temperature of about −30° C. in order to obtain good yields of the desired product, the process could have been carried out at higher or lower temperatures in the presence of other basic substances such as dimethylaniline, trimethylamine, and the like. When addition of the acid chloride was complete the mixture was allowed to gradually warm up to room temperature, at which temperature it was allowed to remain for three days. The mixture was then washed with a sodium bicarbonate solution and then with water to free the ester of contaminants. The methyl ester of thioldimethylvaleric acid was then recovered by distillation. The fraction boiling at 195° C. at 745 mm. pressure was collected as the methyl ester. The ultimate analysis of this fraction compared favorably with the theoretical ultimate analysis for methyl 4,4-dimethyl-thiolpentanoate, as evidenced by the data in the following table.

| Ultimate Analysis | Found for Product | Calculated for Methyl 4,4-Dimethyl-Thiolpentanoate |
|---|---|---|
| Carbon | 60.75 | 60.45 |
| Hydrogen | 10.41 | 10.06 |
| Sulfur | 20.24 | 20.01 |
| Oxygen | [1] 8.60 | 9.48 |

[1] By difference.

The product obtained in accordance with Example II may be combined with the product obtained from Example I, thus giving a high yield of methyl 4,4-dimethyl-thiolpentanoate from a given amount of sulfurized diisobutylene.

While the preferred embodiments and specific examples of our invention have mentioned only a dialkyl sulfate as the alkylating agent, it should be understood that we may employ the less effective monoalkyl sulfates such as methyl hydrogen sulfate, ethyl hydrogen sulfate, butyl hydrogen sulfate, alkyl halides such as methyl chloride, butyl iodide, ethyl bromide, etc., or alkyl sulfonic esters such as methyl p-toluene sulfonate, and the like.

While our invention has been described above with reference to certain specific examples and embodiments, it will be understood that the invention is not limited to such illustrated examples and embodiments and may be variously practiced within the scope of the claims hereinafter made.

We claim:

1. A process for the production of an alkyl ester of thioldimethylvaleric acid which comprises reacting the crude reaction product resulting from the hydrolysis of 4-neopentyl-1,2-dithia-4-cyclopentene-3-thione with an alkyl sulfate, and separately recovering from the reaction mass thus obtained an alkyl ester of thioldimethylvaleric acid.

2. The process of claim 1 wherein the alkyl sulfate is a dialkyl sulfate containing not more than 6 carbon atoms per alkyl group.

3. The process of claim 2 wherein said dialkyl sulfate contains at least one primary alkyl group.

4. The process of claim 3 wherein the primary alkyl group is a methyl group.

5. The process of claim 2 wherein said dialkyl sulfate contains at least one secondary alkyl group.

6. The process of claim 5 wherein the secondary alkyl group is an isopropyl group.

7. A process for the production of an alkyl ester of thioldimethylvaleric acid which comprises hydrolyzing 4-neopentyl-1,2-dithia-4-cyclopentene-3-thione, thereafter reacting the hydrolyzed product with an alkyl sulfate, said alkyl sulfate containing not more than 6 carbon atoms per alkyl group, and separately recovering from the reaction mass thus obtained an alkyl ester of thioldimethylvaleric acid.

8. A process for the production of an alkyl ester of thioldimethylvaleric acid which comprises reacting the product resulting from the hydrolysis of 4-neopentyl-1,2-dithia-4-cyclopentene-3-thione with an alkyl sulfate in the presence of a neutral solvent, said alkyl sulfate containing not more than 6 carbon atoms per alkyl group, whereby a solvent phase and an aqueous phase are formed, and separately recovering an alkyl ester of thioldimethylvaleric acid from the solvent phase.

9. A process for the production of an alkyl ester of thioldimethylvaleric acid which comprises reacting the product resulting from the hydrolysis of 4-neopentyl-1,2-dithia-4-cyclopentene-3-thione with an ethereal solution of an alkyl sulfate, said alkyl sulfate containing not more than 6 carbon atoms per alkyl group, whereby an ether phase and an aqueous phase are formed, and separately recovering an alkyl ester of thioldimethylvaleric acid from the ether phase.

10. A process for the production of the methyl ester of thioldimethylvaleric acid which comprises reacting the product resulting from the hydrolysis of 4-neopentyl-1,2-dithia-4-cyclopentene-3-thione with an ethereal solution of dimethyl sulfate whereby an ether phase and an aqueous phase are formed, separating the ether phase from the aqueous phase, removing the ether from the ether phase by distillation, and fractionating the detherized solution to obtain the methyl ester of thioldimethylvaleric acid boiling at about 194° C. at 744 mm. pressure.

11. A process for the production of an alkyl ester of thioldimethylvaleric acid which comprises heating 4-neopentyl-1,2-dithia-4-cyclopentene-3-thione with a reactant mixture consisting of an aqueous solution of an alkali metal hydroxide, a high boiling neutral solvent and an alkyl sulfate until reaction is substantially complete whereby a solvent phase and an aqueous phase are formed, separating the solvent phase from the aqueous phase, and separately recovering the alkyl ester of thioldimethylvaleric acid from the solvent phase.

12. A process for the production of the methyl ester of thioldimethylvaleric acid which comprises heating 4-neopentyl-1,2-dithia-4-cyclopentene-3-thione with an aqueous solution of an alkali metal hydroxide at reflux temperature until reaction is substantially complete, thereafter cooling the reaction mixture to a temperature of about 20° to 30° C., treating the cooled reaction mixture with an ethereal solution of dimethyl sulfate, the dimethyl sulfate being added in an amount equimolar to the amount of said alkali metal hydroxide employed whereby an ether phase and an aqueous phase are formed, separating the ether phase from the aqueous phase, removing the ether from the ether phase by distillation, and fractionating the de-etherized solution to obtain the methyl ester of thioldimethylvaleric acid boiling at about 194° C. at 744 mm. pressure.

13. A process for obtaining increased yields of the methyl ester of thioldimethylvaleric acid from 4-neopentyl-1,2-dithia-4-cyclopentene-3-thione which comprises hydrolyzing the 4-neopentyl-1,2-dithia-4-cyclopentene-3-thione with an aqueous solution of an alkali metal hydroxide, cooling the reaction mixture thus obtained to a temperature of about 20° to 30° C., treating the cooled reaction mixture with an ethereal solution of dimethyl sulfate, the dimethyl sulfate being added in an amount equimolar to the amount of said alkali metal hydroxide employed whereby an ether phase and an aqueous phase are formed, separating the ether phase from the aqueous phase, removing the ether from the ether phase by distillation, fractionating the de-etherized solution to obtain the methyl ester of thioldimethylvaleric acid, acidifying said aqueous phase with a mineral acid until separation of the organic acids in the form of a supernatant oil is substantially complete, steam-distilling said oil from the acidified mixture, separately recovering from said oil a fraction distilling at 200° to 215° C. consisting essentially of 4,4-dimethylvaleric acid, reacting the 4,4-dimethylvaleric acid thus formed with thionyl chloride, recovering the acid chloride of 4,4-dimethylvaleric acid by distillation, thereafter slowly adding said acid chloride to a mixture of pyridine and methyl mercaptan and separating the methyl ester of thioldimethylvaleric acid from the mixture thus formed.

14. A process for the production of the methyl ester of thioldimethylvaleric acid which comprises heating 4-neopentyl-1,2-dithia-4-cyclopentene-3-thione with an aqueous solution containing from about 4 to 8 moles of sodium hydroxide in a concentration of from about 0.5 to about 50 per cent by weight at reflux temperature until reaction is substantially complete, thereafter cooling the reaction mixture to a temperature of about 20° to 30° C. and adding an ethereal solution of dimethyl sulfate, the dimethyl sulfate being added in an amount equimolar to the amount of said sodium hydroxide employed, whereby an ether phase and an aqueous phase are formed, separating the ether phase from the aqueous phase, removing ether from the ether phase by distillation, and fractionating the de-etherized solution to obtain the methyl ester of thioldimethylvaleric acid.

RODERICK S. SPINDT.
DONALD R. STEVENS.

REFERENCES CITED

The following references are of record in the file of this patent:

UNITED STATES PATENTS

| Number | Name | Date |
| --- | --- | --- |
| 2,402,560 | Langkammerer | June 25, 1946 |
| 2,445,142 | Himel | July 13, 1948 |
| 2,458,075 | Himel | Jan. 4, 1949 |